United States Patent [19]

Chaize

[11] Patent Number: 5,141,356
[45] Date of Patent: Aug. 25, 1992

[54] LOCKING DEVICE FOR ELONGATED REINFORCEMENT UNDER TENSION

[76] Inventor: Alain Chaize, 3, rue Greneta, F-75003 Paris, France

[21] Appl. No.: 656,170

[22] PCT Filed: Jun. 22, 1990

[86] PCT No.: PCT/FR90/00459

§ 371 Date: Apr. 23, 1991

§ 102(e) Date: Apr. 23, 1991

[87] PCT Pub. No.: WO91/00401

PCT Pub. Date: Jan. 10, 1991

[30] Foreign Application Priority Data

Jun. 27, 1989 [FR] France ............... 89 08554

[51] Int. Cl.⁵ .............................. F16B 7/02
[52] U.S. Cl. ...................... 403/368; 403/371; 403/374; 403/409.1; 254/29 H
[58] Field of Search .......... 403/368, 369, 371, 374, 403/409.1; 254/104, 29 A; 285/421

[56] References Cited

U.S. PATENT DOCUMENTS

| | | | |
|---|---|---|---|
| 1,712,108 | 5/1929 | Goeller | 403/369 X |
| 2,009,318 | 7/1935 | Highfield | 403/371 X |
| 2,177,364 | 10/1939 | Fotsch | 403/369 X |
| 3,447,784 | 6/1969 | Launay | 254/29 A |
| 3,703,748 | 11/1972 | Kelly | 403/368 |
| 4,146,951 | 4/1979 | Howlett | |
| 4,209,661 | 6/1980 | Pate et al. | 285/421 X |
| 4,662,134 | 5/1987 | Illgner | 403/371 X |

FOREIGN PATENT DOCUMENTS

| | | |
|---|---|---|
| 0322317 | 6/1989 | European Pat. Off. |
| 1234969 | 2/1967 | Fed. Rep. of Germany |
| 3438355 | 4/1986 | Fed. Rep. of Germany |
| 3536926 | 4/1987 | Fed. Rep. of Germany |
| 2625241 | 6/1989 | France |
| 2077343 | 12/1981 | United Kingdom |

Primary Examiner—Randolph A. Reese
Assistant Examiner—Heather Chun
Attorney, Agent, or Firm—Young & Thompson

[57] ABSTRACT

The locking device comprises a support plate (3) perforated by at least one flared opening (4), into which there penetrates a wedge (5) of complementary shape which is crossed axially by the reinforcement (2) with which it comes to engage by an internal toothing (12). The wedge (5) is intended to be driven by force into the opening (4) by an initial pressure and then by the tension of the reinforcement (2), and comprises on at least a part of its external surface an anti-return toothing (13) which is intended to come to engage with the wall (7) of the opening (4) of the support plate (3) when this wedge (5) has been driven into said opening (4). This toothing (13) has, in the direction of the length of the wedge (5), toothed zones (13a) alternated with recessed untoothed zones (13b). Used in particular for locking an elongated reinforcement under tension, such as a tension rod, strand, cable or similar, in particular in a work made of prestressed concrete.

8 Claims, 2 Drawing Sheets

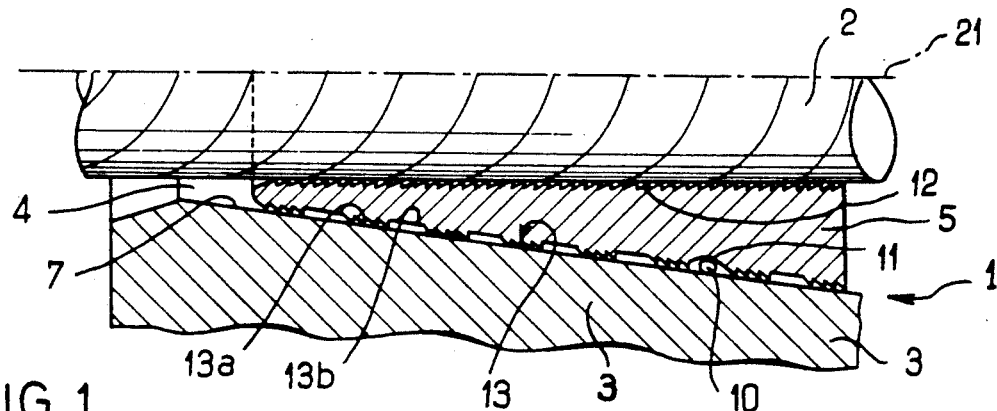
FIG_1
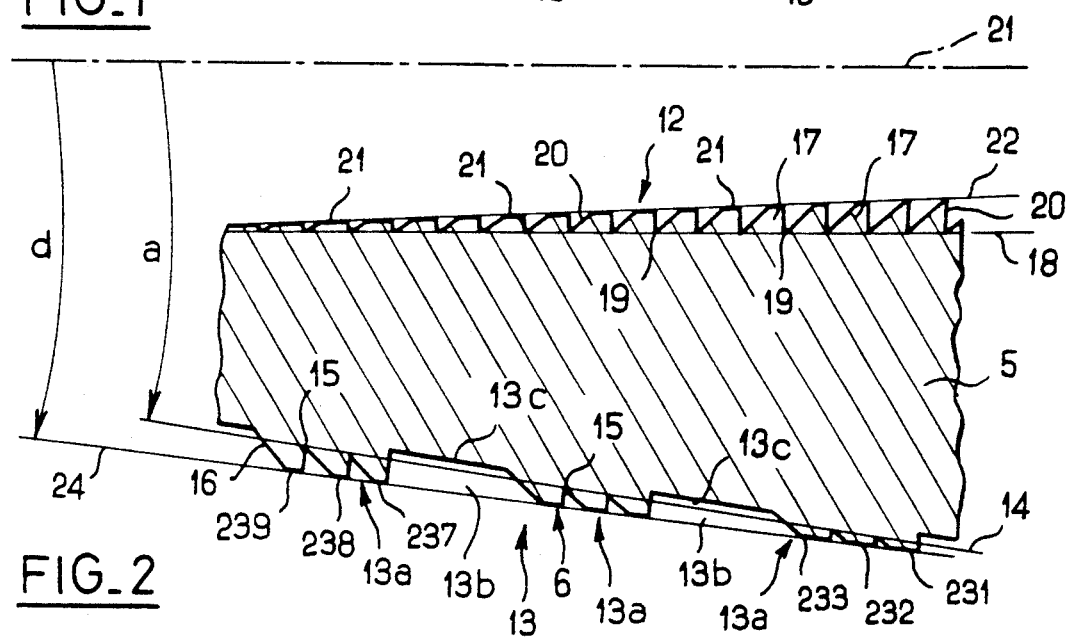
FIG_2
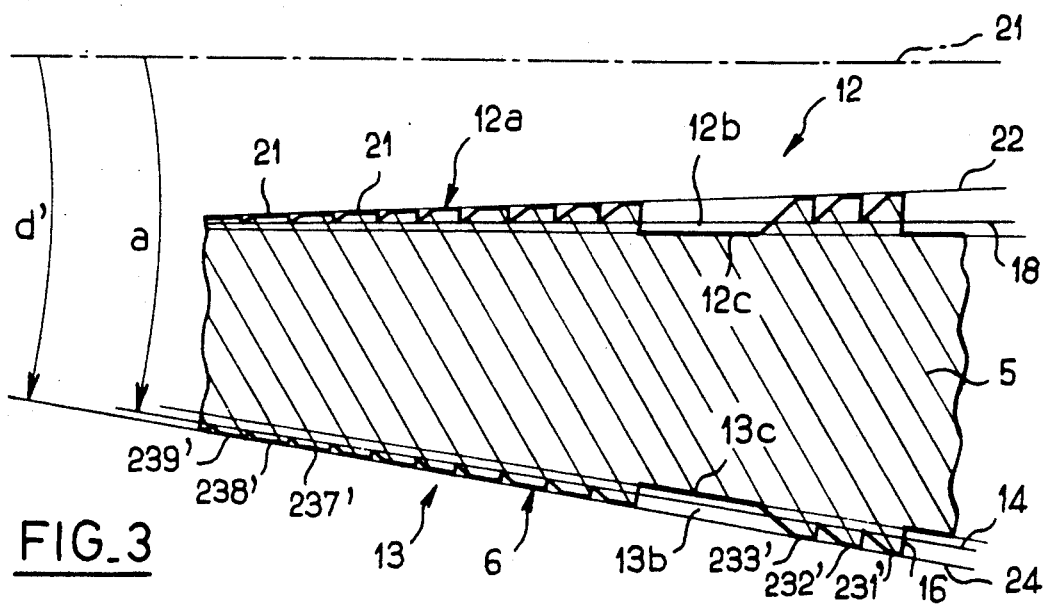
FIG_3

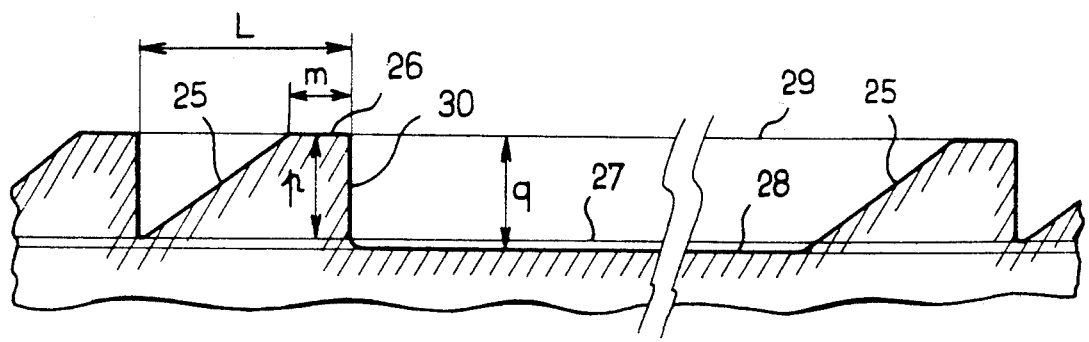
FIG_4
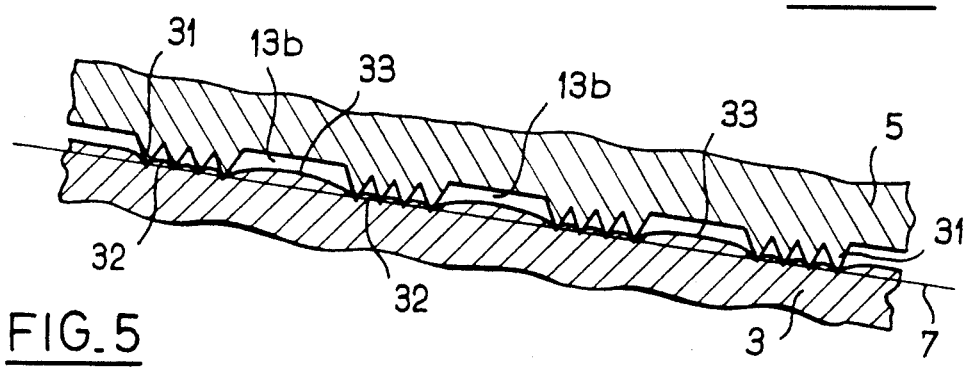
FIG_5
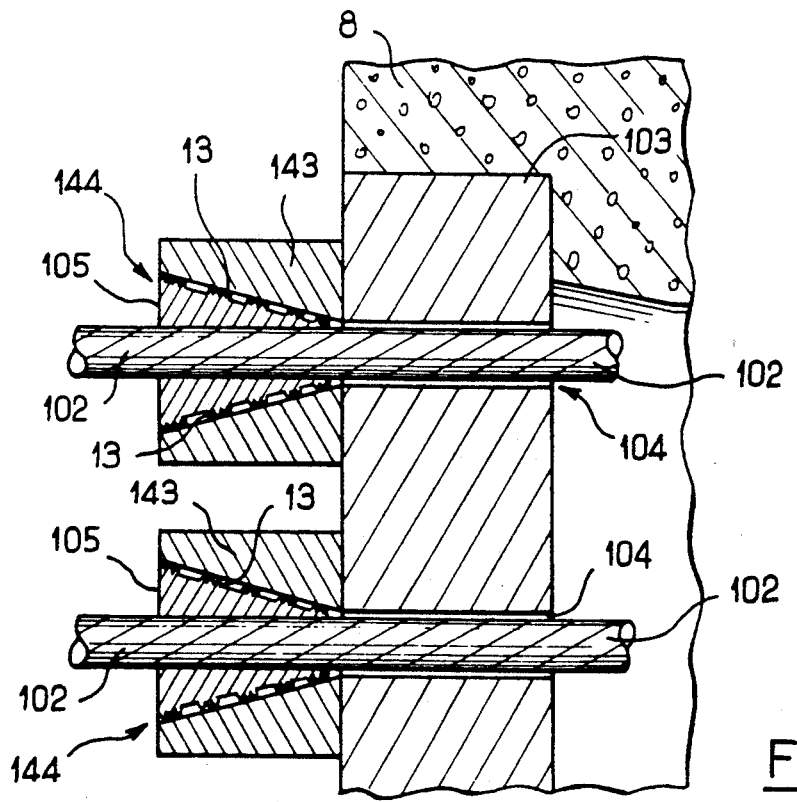
FIG_6

LOCKING DEVICE FOR ELONGATED REINFORCEMENT UNDER TENSION

The present invention relates to a locking device for an elongated reinforcement under tension, such as a tension rod, strand, cable or similar.

Such locking devices are known which comprise in a general manner a support plate perforated by at least one flared opening, into which there penetrates a wedge of complementary shape which is crossed axially by the reinforcement with which it comes to engage by means of an internal toothing, said wedge being intended to be driven by force into the opening by an initial pressure and then by the tension of the reinforcement.

In his previous patent application FR-A-2,625,241, the applicant described a wedge comprising on at least a part of its external surface an anti-return toothing which is intended to come to engage with the internal wall of the opening of the support plate when this wedge has been driven into said opening.

Such a toothing, the teeth of which bite into the metal of said internal wall, exerts the anti-return effect desired and holds the reinforcement in place in relation to the support plate, even if this reinforcement is no longer tensioned for whatever reason it may be, vibrations, aging of the work concerned, etc.

Such a toothing therefore provides satisfaction and serves the function for which it has been designed.

However, at the time of tensioning of the reinforcement and at the end of this operation, the teeth of this toothing, which start to bite into the metal of the internal wall of the support plate, have a tendency to oppose a deeper penetration of the wedge into the opening. Thus, and in relation to a wedge of which the external surface is smooth, a wedge of which the external surface comprises an anti-return toothing involves the risk of being driven in less for a given driving pressure, or can only be driven in in the same manner by a greater driving pressure.

The applicant has thus sought to improve said wedge in order to propose a wedge which makes it possible to maximize the anti-return grip of the teeth of the external toothing in the opening of the support plate, while minimizing the force necessary to drive in this wedge.

According to the invention, the locking device of the abovementioned type is characterized in that this toothing has, in the direction of the length of the wedge, toothed zones alternated with recessed untoothed zones.

As a result of the presence of the recessed untoothed zones, the surface of contact of the teeth of the external surface of the wedge with the internal wall of the opening of the support plate is substantially reduced, and the teeth, reduced in number, exert a resistance to the driving in of the wedge which is substantially reduced in relation to the earlier wedge. It can thus be said that the wedge is driven in and slides more easily inside the opening.

Similarly, the clamping force exerted by the support plate on the external surface of the wedge is in fact exerted on a reduced tooth surface. This thus creates a contact pressure between the teeth and the wall of the opening which is proportional to that obtained in the case of the earlier wedge in a ratio which is the inverse of the ratio between the respective tooth surfaces. The teeth thus bite more deeply into the metal of the wall of the opening in order to anchor themselves better in the metal and have a more powerful anti-return effect.

Moreover, the following surprising effect is observed. As a result of the increased pressure exerted by the teeth, creep of the metal of the wall of the opening takes place; the metal, pushed away by the teeth, creeps towards the zones of the wall situated opposite the recessed untoothed zones and there creates protuberances projecting towards the inside of the opening in relation to the surface of the initial wall of the opening; these protuberances thus constitute, with the adjacent teeth, anchorages exerting a very significant additional anti-return effect.

According to an advantageous alternative of the invention, the teeth of the external toothing are regularly spaced and extend from the essentially frusto-conical external surface of the wedge, and the angle at the top of the frusto-conical surface connecting the bottom of the teeth is essentially identical to the angle of the internal tapered surface of the opening of the support plate.

Excellent contact is thus obtained between the external surface of the wedge and the internal wall of the opening of the support plate without deformation of the wedge.

According to a preferred alternative of the invention, the teeth of the internal toothing are regularly spaced and extend from the essentially cylindrical internal surface of the wedge, and at least some of the teeth of the internal toothing at the front end of smaller diameter of the wedge are truncated at their top according to an essentially frusto-conical surface which is coaxial with the wedge and flares towards the rear end of greater diameter of the latter.

The truncated teeth at the front of the wedge thus have little tendency to bite into the metal of the reinforcement and on the other hand exert on the surface of the latter very powerful clamping, which is doubly beneficial in this place where the reinforcement is still subject to its nominal tension.

On the other hand, the less truncated or untruncated teeth on the rear part of the wedge can without disadvantage bite deeply into the metal of the reinforcement in order to anchor the latter securely in this place where it is practically no longer tensioned.

According to an advantageous alternative of the invention, at least some of the teeth of the external toothing of the wedge are truncated at their top, the residual height of the teeth situated on the side of the rear end of the wedge being less than that of the teeth situated on the side of the front end of the wedge.

Other characteristics and advantages of the invention will emerge in the description below.

In the attached drawings, given by way of non-limiting example,

FIG. 1 is a half-view in axial cross-section of a locking device according to the present invention;

FIG. 2 is an enlarged partial view of a detail of FIG. 1 relating to a wedge according to another embodiment of the invention;

FIG. 3 is a view similar to FIG. 2 relating to another embodiment of the invention;

FIG. 4 is a greatly enlarged partial view in cross-section of a detail of an external toothing according to the present invention;

FIG. 5 is a diagram in cross-section illustrating the mode of action of an external toothing according to another embodiment of the present invention;

FIG. 6 is a view in cross-section of a locking device according to another embodiment of the invention. which is intended for a reinforcement consisting of a number of separately anchored elements.

In the particular embodiment of the invention represented in FIG. 1, the locking device 1 for an elongated reinforcement under tension 2, such as a tension rod. strand. cable or similar, comprises a support plate 3 perforated by a flared opening 4, into which there penetrates a wedge 5 of complementary shape which is crossed axially by the reinforcement 2 with which it comes to engage by means of an internal toothing 12.

The wedge 5 is constituted in known manner by three independent sectors separated by three radial slots which extend over the entire length of the wedge. These three sectors are retained by a keeper 10 arranged in a groove 11 made on the external surface 6 of the wedge 5.

The internal surface of the wedge 5 is provided with a toothing 12, the teeth of which bite into the reinforcement 2 in order to oppose a retreat of the latter towards the inside of the work. To this end, the internal surface of the wedge has been surface-treated, in a likewise known manner. in order to have great hardness, of the order of 56 HRC (approximately 190 kg/mm$^2$), in order to facilitate the biting of the teeth into the reinforcement.

As a result of this, the tension of the reinforcement 2 has the effect of drawing and pulling the wedge 5 towards the bottom of the flared opening 4 of the support plate 3, which causes the self-locking effect of the wedge 5.

As represented in greater detail in FIGS. 2 to 5, the teeth 17 of the internal toothing 12 are regularly spaced and extend from the internal cylindrical surface 18 connecting the bottoms 19 of the fillets 20 of this internal toothing 12.

Furthermore, the wedge 5 has, over its entire external surface 6, a projecting anti-return toothing 13 which is intended to come to engage with the wall 7 of the opening 4 of the support plate 3 when this wedge 5 has been driven into said opening 4.

The external surface 6 of the wedge 5 is, like the internal surface, surface-treated at least to the level of the toothing 13 in order to have great hardness of the same order of size (56 HRC or 190 kg/mm$^2$).

This facilitates the biting of the anti-return toothing 13 into the metal of the internal wall 7 of the opening 4 of the support plate 3; this metal of the internal wall 7 can for its part have a hardness of the order of 110 kg/mm$^2$, weaker therefore than that of the external surface of the wedge.

According to the invention, and as represented in the figures, this toothing 13 has, in the direction of the length of the wedge 5, toothed zones 13a alternated with recessed untoothed zones 13b.

The surfaces 13c of the recessed untoothed zones 13b are situated inside the surface 14 connecting the bottoms of the teeth of the toothing 13; they could also coincide with this surface (see FIGS. 2 to 4).

As represented, the teeth 22 [sic] of the external toothing 13 are regularly spaced and extend from the frusto-conical surface 14. The angle at the top a of the frusto-conical surface 14 corresponds essentially to the angle of the internal frusto-conical surface 7 of the opening 4 of the support plate 3.

In the embodiment in FIG. 2, the teeth 17 of the internal toothing 12 are truncated at their top 21 according to an essentially tapered surface 22 which is coaxial with the wedge 5 and flares towards the rear end of greater diameter of the latter.

In this same embodiment, the teeth 23 of the external toothing 13 are likewise truncated at their top by a conical surface 24 with an angle at the top d which is less than the angle a: as a result of this, the residual height of the teeth 231, 232, 233 situated at the rear end of the wedge 5 is less than that of the teeth 237, 238, 239 situated at the front end of smaller diameter of the wedge 5.

In the embodiment in FIG. 3, the truncated internal toothing 12 likewise has toothed zones alternated with recessed untoothed zones 12b.

The teeth 23 of the external toothing 13 are truncated at their top by a conical surface 24 with an angle at the top d' which is greater than the angle a; the residual height of the teeth 231', 232', 233' situated at the rear end of the wedge 5 is greater than that of the teeth 237', 238', 239' situated at the front end of smaller diameter of the latter.

The recessed untoothed zones 12b and 13b are provided uniquely in the rear part of greater diameter of the wedge 5, where the residual heights of the respective teeth 17 and 23 are greatest, for a reason which will be specified below.

In a general manner, the respective teeth 17 and 23 of the internal and external toothings 12 and 13 respectively can have any contour. They can be symmetrical or asymmetrical, arranged in rings or in a spiral and have any dimensions and shapes. The teeth 17 can have shapes and dimensions which are the same as or different to those of the teeth 23.

In the embodiment in FIG. 4, which can be used for both toothings 12 and 13, the teeth 25 are annular asymmetrical teeth which thus constitute gullet teeth. These teeth 25 have, for example, a pitch L of 0.5 mm and have their top truncated at 26 parallel to the surface 27 connecting the fillet bottoms: the height p of the truncated top 26 in relation to the surface 27 is, for example, 0.2 mm and the height q of the same truncated top 26 in relation to the surface 28 of the recessed untoothed zones 29 is, for example. 0.3 mm. The fillet flank 30 opposing the return is, for example, perpendicular to the surfaces 27 and 28.

The length of the toothed zones and the length of the recessed untoothed zones can be equal, for example equal to 5 mm.

In the embodiment in FIG. 5, which illustrates the effect of the wedge according to the present invention and which will be commented upon below, the teeth 31 are symmetrical and have a cross-section in the form of an isosceles triangle.

In the embodiment in FIG. 6, which represents a device provided for the individual locking of various strands 102 of a reinforcement, the support plate 103 embedded in the body of concrete 8 has a number of openings 104 distributed around its center for the passage of said strands, each strand 102 being locked by a wedge 105, at least a part of said wedges 105 having on its periphery an anti-return toothing 13 according to the invention.

In the example represented, the wedges 105 are driven into the tapered openings 144 of support blocks 143 mounted and fixed on the support plate 103.

The wedges 5, 105 according to the present invention are produced easily in a number of machining stages. Firstly, the toothings 12 and 13 are machined in a known manner. Then, if the case arises, one or the other or all these toothings are truncated. Finally, the recessed untoothed zones 13b and possibly 12b are made.

A description will now be given of the mode of use of the various types of wedge according to the present invention.

The tensioning of a reinforcement is a known operation which does not require description here. At the end of this operation, the wedge 5 is pushed with force into the opening 4 in order to start to anchor the teeth 17 of the internal toothing 12 in the metal of the reinforcement and the teeth 23 of the external toothing 13 in the metal of the internal wall 7. The tensioned reinforcement 2 is then released, which completes the anchoring of the wedge 5 in relation to the reinforcement and in relation to the support plate 3.

As represented in detail in FIG. 5, the clamping force of the reinforcement is exerted by means of a reduced number of teeth. These teeth thus exert a substantially greater pressure than in the case of a continuous toothing, according to a multiplying coefficient equal to the inverse of the ratio between the respective contact surfaces.

In the simple case represented of untruncated teeth 31 constituting the external toothing 13 of a wedge 5 in contact with the internal wall 7 of the opening of the support plate 3, the ends of the teeth 31 penetrating into the metal of the wall 7 push back the metal which creeps in two ways. The metal creeps between the ends of two adjacent teeth, which results in the bulging effect represented at 32 in the figure. In addition, the metal of the zone opposite the toothed zone creeps laterally towards the region opposite the recessed untoothed zone 13b of the wedge, which forms a protuberance 33 which projects in relation to the initial wall 7. This protuberance 33 will in turn exert a powerful anti-return effect with regard to the adjacent teeth 31.

It is in order that this creep be allowed to happen freely that it is envisaged that the surfaces 13c of the recessed zones 13b are preferably comprised inside the surface connecting the bottoms of the fillets 16.

The phenomenon is identical for the other tooth shapes, those of the teeth represented in FIG. 4 as well as those of the truncated teeth 231 to 239 and 231' to 239' represented respectively in FIGS. 2 and 3. The most truncated teeth 231, 232, 233 in FIG. 2 and 237', 238' and 239' in FIG. 3 of course penetrate very little into the metal of the wall 7 and in contrast bear very strongly against said wall. These teeth, as they only penetrate very little and exert a relatively weaker pressure than the truncated teeth as a result of their great contact surface, cause only little or no creep. This is why, in FIG. 3, the recessed untoothed zones 13b are only provided in the region of the slightly truncated or untruncated teeth 231', 232', 233' which are capable of causing great creep.

The phenomenon is likewise identical as far as the internal toothing 12 in contact with the reinforcement is concerned. However, if the reinforcement 2 is a strand constituted by twisted wires, the phenomenon will be less extensive than in the previous case, since the toothing is only in contact with the periphery of the twisted wires and is thus only in contact with the reinforcement via a part of its surface.

In all cases, as the angle a of the surface 14 connecting the bottoms of the fillets of the external toothing of the wedge corresponds essentially to the angle at the top of the internal wall 7 of the opening 4 of the support plate, the internal and external walls of the wedge bear very well respectively against the reinforcement and against the wall 7 of the support plate, without deformation of the wedge and thus without risk of breaking the latter. When one or the other of said internal and external surfaces of the wedge is truncated, or when both these surfaces are truncated, it can be considered that the penetration of the teeth, which increases as the truncation decreases, essentially compensates this truncation in order to preserve this excellent contact between the wedge and the reinforcement on the one hand, and the wall of the opening on the other hand.

The invention is of course not limited to the embodiments which have just been described and numerous changes and modifications can be carried out on the latter without leaving the scope of the invention.

I claim:

1. Locking device for an elongated reinforcement under tension, such as a tension rod, strand, cable or similar (2, 102), comprising a support plate (3, 143) perforated by at least one flared opening (4, 144), into which there penetrates a wedge (5, 105), of complementary shape which is crossed axially by the reinforcement (2, 102) with which is comes to engage by means of an internal toothing (12), said wedge (5, 105) being intended to be driven by force into the opening (4, 144) by an initial pressure and then by the tension of the reinforcement, the wedge (5, 105) comprising on at least a part of its external surface an anti-return toothing (13) which is intended to come to engage with the wall of the opening (4, 144) of the support plate (3, 103), when this wedge (5, 105) has been driven into said opening (4, 144), wherein said anti-return toothing (13) has, in the direction of the length of the wedge (5, 105), toothed zones (13a) each comprised of a plurality of teeth, said toothed zones (13a) alternating with recessed untoothed zones (13b).

2. Device according to claim 1, there being gaps between said plurality of teeth of each toothed zone (13a), said recessed untoothed zones (13b) having a depth at least as great as the depth of said gaps.

3. Device according to claim 1, wherein said internal toothing (12) of the wedge (5, 105) comprises a plurality of teeth that are regularly spaced apart by gaps having bottoms that lie on an imaginary cylinder, at least some of said teeth (17) of the internal toothing (12) having upper edges (21) that lie on the imaginary frustoconical surface (22) which is coaxial with the wedge and which has its largest diameter at the thickest part of the wedge.

4. Device according to claim 1, wherein at least some of said plurality of teeth are truncated.

5. Device according to claim 4, said plurality of teeth having a height which varies inversely as the thickness of the wedge.

6. Device according to claim 1, said toothed zones (13a) and recessed untoothed zones (13b) alternating with each other over the entire external surface of the wedge (5, 105).

7. Device according to claim 1, wherein said internal toothing (12) comprises a plurality of toothed zones (12a) each comprised by a plurality of teeth, said toothed zones (12a) of said internal toothing (12) alternating with recessed untoothed zones (12b).

8. Device according to claim 1, wherein said support plate has a plurality of said openings therethrough and a said elongated reinforcement extending through each said opening, a said wedge surrounding each said elongated reinforcement, and means defining said flared openings surrounding each said wedge and transmitting force from said wedge to said support plate.

* * * * *